US009020647B2

(12) United States Patent
Johnson et al.

(10) Patent No.: US 9,020,647 B2
(45) Date of Patent: Apr. 28, 2015

(54) SYSTEM AND METHOD FOR CLIMATE CONTROL SET-POINT OPTIMIZATION BASED ON INDIVIDUAL COMFORT

(75) Inventors: Joseph A. Johnson, Johnson City, TN (US); Chellury Sastry, Richland, WA (US); Xu Ning, Boston, MA (US); Amar H. Patel, Piscataway, NJ (US); Viraj Srivastava, Kennewick, WA (US)

(73) Assignee: Siemens Industry, Inc., Alpharetta, GA (US)

(*) Notice: Subject to any disclaimer, the term of this patent is extended or adjusted under 35 U.S.C. 154(b) by 573 days.

(21) Appl. No.: 12/412,421

(22) Filed: Mar. 27, 2009

(65) Prior Publication Data
US 2010/0262298 A1    Oct. 14, 2010

(51) Int. Cl.
*G05D 23/19*  (2006.01)
*F24F 11/00*  (2006.01)

(52) U.S. Cl.
CPC ........... *F24F 11/001* (2013.01); *F24F 11/0012* (2013.01); *F24F 11/0015* (2013.01); *F24F 11/006* (2013.01); *F24F 2011/0057* (2013.01)

(58) Field of Classification Search
CPC ..................................................... G05D 23/19
USPC .............. 700/277, 276, 291; 705/412; 706/48
See application file for complete search history.

(56) References Cited

U.S. PATENT DOCUMENTS

| | | | |
|---|---|---|---|
| 5,170,935 A | 12/1992 | Asada | |
| 6,145,751 A | 11/2000 | Ahmed | |
| 2001/0001318 A1 | 5/2001 | Kamiya | |
| 2004/0117330 A1* | 6/2004 | Ehlers et al. | 705/412 |

FOREIGN PATENT DOCUMENTS

| | | | |
|---|---|---|---|
| JP | 62158934 A | 7/1987 | |
| JP | 4086441 A | 3/1992 | |
| WO | WO 2005024311 A1 | 3/2005 | |
| WO | WO 2005050098 A1 | 6/2005 | |
| WO | WO 2007027632 A2 | 3/2007 | |

OTHER PUBLICATIONS

Olesen et al., "A Better Way to Predict Comfort" pp. 20-26, ASHRAE Journal, Aug. 2004.*
Brager et al., "Climate, Comfort, & Natural Ventilation: A new adaptive comfort standard for ASHRAE Standard 55" pp. 1-18, University of California, Berkeley, 2001.*

* cited by examiner

*Primary Examiner* — Tejal Gami

(57) ABSTRACT

A system and method for calibrating a set-point for climate control includes a sensor network having a plurality of sensors configured to report a climate condition. A database is configured to receive reports from the sensors and generate one or more profiles reflecting at least one of historic climate control information and occupant preferences. A controller is configured to receive information from the profiles to generate a set-point based upon an optimization program. The optimization program is implemented to balance competing goals to generate the set-point for controlling climate control equipment in accordance with the set-point.

18 Claims, 7 Drawing Sheets

300

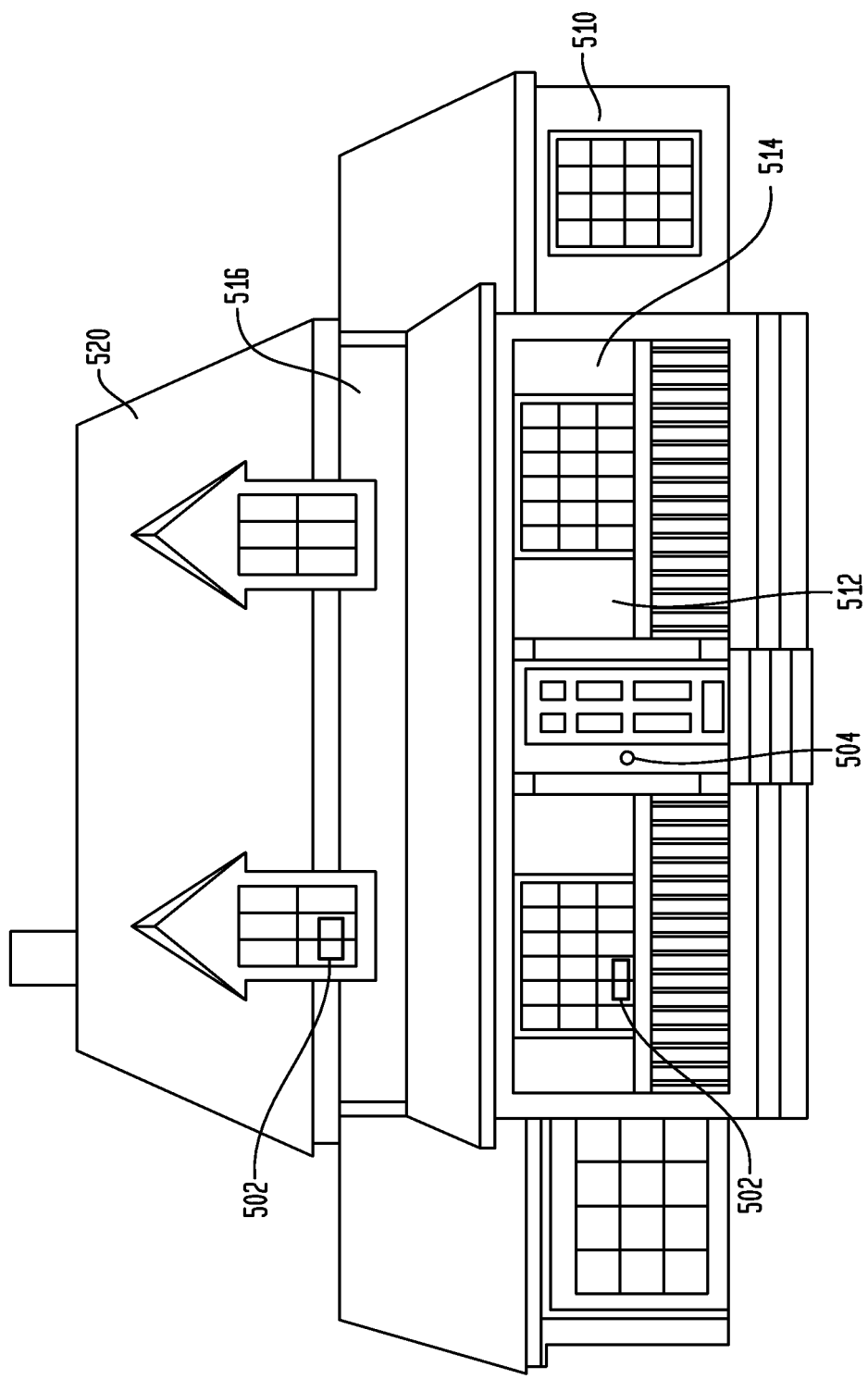

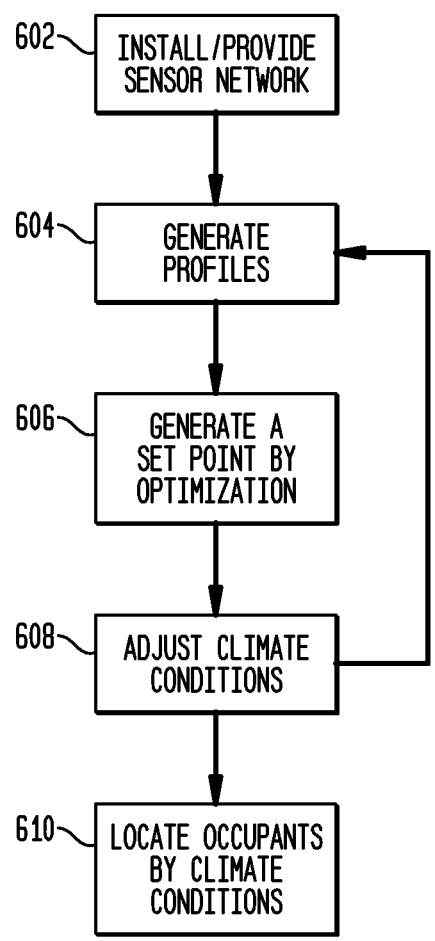

SYSTEM AND METHOD FOR CLIMATE CONTROL SET-POINT OPTIMIZATION BASED ON INDIVIDUAL COMFORT

BACKGROUND

1. Technical Field

This disclosure relates to climate control systems, and more particularly, to a system and method for optimizing parameter (e.g., temperature) control in accordance with occupants present in an area of a building and a building as a whole.

2. Description of the Related Art

In industrial, commercial and residential buildings, climate is typically controlled using a thermostat. A thermostat has two basic functions. It stores a set-point and measures the temperature of its immediate surroundings. If the temperature does not agree with the set-point, the climate control system heats or cools the surroundings until the set-point is met.

In many buildings, individuals are not allowed to adjust the system based on their individual comfort level because they would be changing the temperature for the whole room or zone. If everyone was permitted to do this, energy would be wasted and the temperature of the room would change based on whoever the person is that controls the thermostat at the time. Further, a controlling thermostat may not always be placed at the most optimal location for temperature reading.

In other scenarios dueling heating and cooling systems are present. For example, a person will set one heating ventilation and cooling (HVAC) system to cool an area, and a second HVAC system adjacent to the one being cooled begins to heat due to its programmed set-point. This leads to both areas being uncomfortable because the two HVAC systems are in conflict with each other.

SUMMARY OF THE INVENTION

A system and method for calibrating a set-point for climate control includes a sensor network having a plurality of sensors configured to report a climate condition. A database is configured to receive reports from the sensors and generate one or more profiles reflecting at least one of historic climate control information and occupant preferences. A controller is configured to receive information from the profiles to generate a set-point based upon an optimization program. The optimization program balances competing goals to generate the set-point for controlling climate control equipment in accordance with the set-point.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 6 is a perspective view of a home showing placement of sensors and their influence of thermostats based on the sensor locations in accordance with the present principles; and FIG. 7 is a block/flow diagram showing a system/method for generating a set-point to adjust climate control equipment in accordance with the present principles.

DETAILED DESCRIPTION OF PREFERRED EMBODIMENTS

Figure 1:
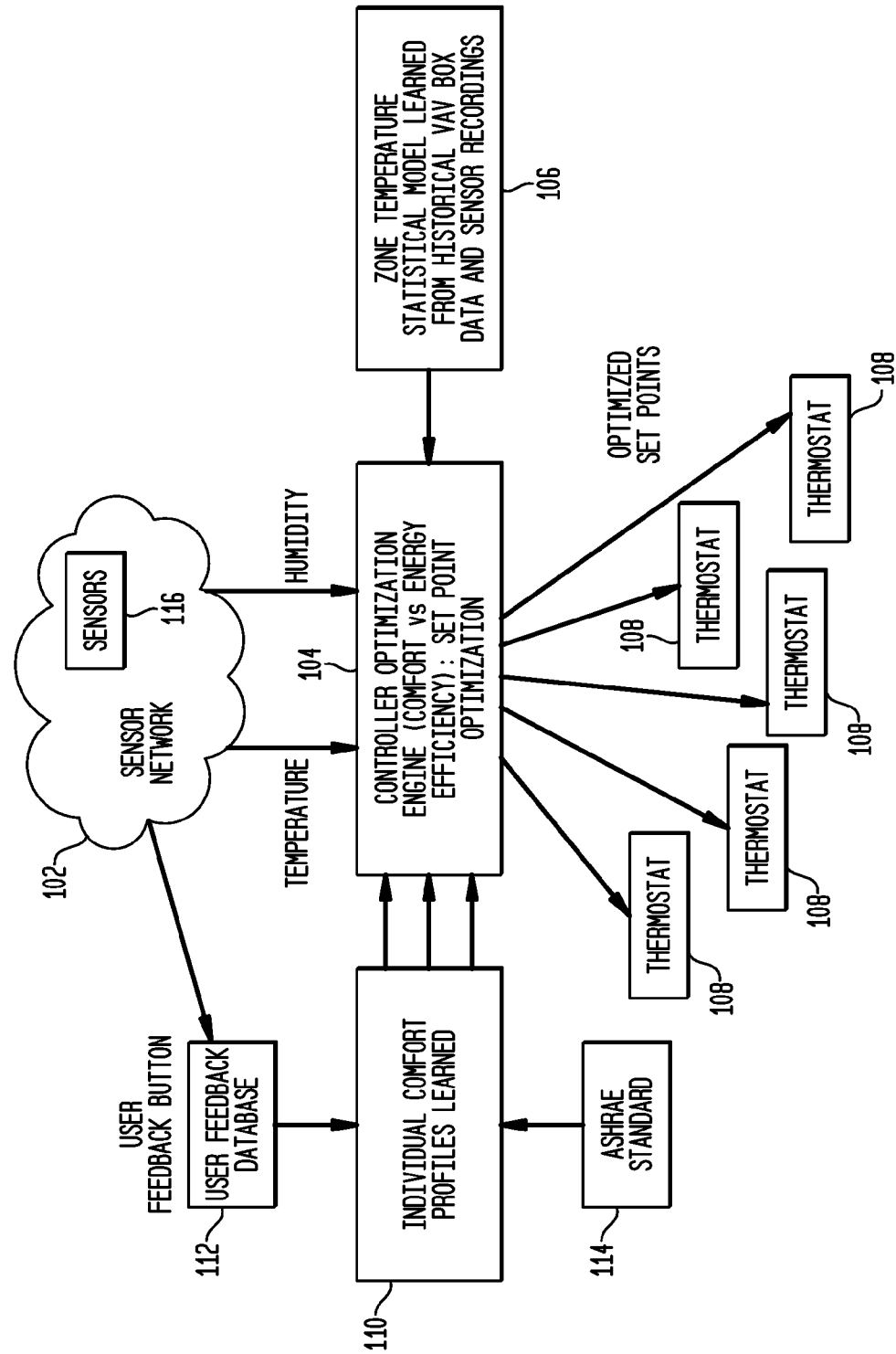
FIG. 1 is a block/flow diagram showing a system/method for generating a set-point(s) to control climate control equipment in accordance with the present principles.

The present principles provide communications devices to provide feedback for setting a set-point of a reactive climate control device. A system learns from occupants of an area or a room how climate control equipment should be adjusted so that the occupants are more comfortable. Such a system provides more pleasing comfort levels for more individuals in the area and saves energy and money at the same time. A climate control system activation device (e.g., a thermostat, a smart thermostat or other reactive device) will calibrate or have calibrated by a computer device or controller its set-point based on input from sensors and the input from the people indicating their comfort level (e.g., hot or cold). With this system, the room environment is controlled based on a wireless sensor/user feedback readings in the room and perhaps throughout a building.

In one embodiment, the present system will take into consideration temperature and humidity levels of the area that it is physically controlling as well as those outside of this area. For example, information about the environment outside of the building as well as the temperature and humidity level of areas that affect its own area or zone will be considered. Each person will also have a chance to affect his or her own climate making the local environment more comfortable for more people, and more accurately reflect the desire of the individuals in that environment.

The functions of the various elements shown in the figures can be provided through the use of dedicated hardware as well as hardware capable of executing software in association with appropriate software. When provided by a processor or controller, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams and the like represent various processes which may be substantially represented in computer readable media and so executed by a computer or processor, whether or not such computer or processor is explicitly shown.

Furthermore, the invention may include a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Referring now in specific detail to the drawings in which like reference numerals identify similar or identical elements throughout the several views, and initially to FIG. 1, a Proprietary Optimized Service-Oriented-Architecture Platform (POSOAP) 100 is illustratively depicted in accordance with one illustrative embodiment. Middleware of the system 100 receives input from many different feedback sources and then controls all thermostats or equivalent devices 108 to maximize energy efficiency. System 100 includes an optimization engine or controller 104 configured to determine comfort against energy or comfort versus outside conditions, or any other programmed criteria to be employed for optimization of system performance. Controller 104 can be programmed with policies that are balanced to optimize the set-points sent to the thermostats 108.

Engine 104 receives inputs from a plurality of sensors 116 (which may be wired or wirelessly connected to the controller 104) in a sensor network 102. The sensors 116 may include occupant feedback devices 116 or measurement devices (thermometers, barometers, humidity readings, etc.) for measuring present climate conditions. The feedback sensors 116 are preferably wireless devices configured to transmit feedback to the engine 104 regarding a comfort status of an individual. In one simple embodiment, a temperature status may be set to hot, cold or acceptable. In other embodiments, a preferred temperature and/or humidity may be provided (entered or selected on the sensor 116).

In one embodiment, the user data entered or selected on the sensors 116 is stored in a user feedback database 112. The database 112 stores historic user data such as preferred climate conditions (e.g., temperature, humidity, etc.), time of day and work schedules (time in, time out, lunch, etc.), etc. The database 112 is preferably employed to learn and store individual comfort profiles in block 110. The comfort profiles 110 may be stored with comfort standards 114, such as American Society of Heating, Refrigerating, and Air-Conditioning Engineers (ASHRAE) standards, which may provide a baseline comfort level. The standards may include seasonal data, or specific information that may affect the profiles 110. The profiles 110 may store differential information, e.g., which show where the individual comfort levels deviate from the comfort standards 114. This saves memory space.

In one embodiment, a zone temperature statistical model (or building information model) 106 may be employed to provide programming guidance for climate control. The model 106 may be based on historical climate conditions (e.g., settings for a day having a same exterior temperature and humidity, based on a calendar date, based upon available equipment, etc.) and/or sensor recordings and conditions for nearby zones or external conditions. For example, model 106 may include a statistical model of an entire building so that different zones and their climate settings, different climate control devices, and exterior conditions may all be accounted for in the optimization set-point sent to thermostats 108. The model 106 may include factors such as airflow models, HVAC configurations, influences between zones (zone correlations), number of occupants and other criteria that provide useful information is accessing and predicting climate influences.

The controller 104 may consider some or all of the inputs. The inputs may be weighted in accordance with a system design or user preference. The inputs in the illustrative example include one or more of comfort profiles 110, sensors 116 of the sensor network 102, statistical models 106, and/or other environmental conditions, measurements or settings (from network 102). Controller 104 receives these inputs and performs an optimization. This optimization may include comfort satisfaction for a largest number of persons present in the area being climate controlled or other criteria, e.g., criteria set by a landlord or premises owner, etc.

As part of the optimization, climate control devices 108 are set to provide the optimized control. In one embodiment, the climate control devices 108 include thermostats which control heating or cooling equipment which is controlled in accordance with the thermostats. In another embodiment, the control devices 108 may include humidity, vent or fan adjusting devices to control air flow and quality into different areas of a building. In yet another embodiment, the control devices 108 may include valve adjusting devices to control water or heat exchange fluid flow in pipes to different areas of a building.

Controller 104 may optimize set-points in a plurality of ways using, for example, an optimization program or a hard-wired circuit or integrated circuit. The optimization program may be configured to provide one or more optimizations. A few illustrative techniques are described herein. Others may be employed as well.

Energy cost information (e.g., from a power company) may be retrieved and updated for use with the optimization of controller 104. Two feasible scenarios include minimizing total energy (or cost) and maximizing a minimum set-point value.

1) Minimize total energy includes assuming each degree of a set-point corresponds to a certain constant amount of energy consumption, and minimizes the sum of energy consumption. This ensures all local temperatures within a thermal comfort zone. This can be stated mathematically as:

minimize c'x where c is the energy cost or other cost to maintain set-point x, subject to Hx+b=y where H is a slope of a line found by regression between measured and desired parameter settings, e.g., minimum and maximum temperature plotted on the y axis and minimum and maximum set-point points plotted on the x axis, x is the set-point, y is the measured parameter (e.g., temperature or other measured criteria) and b is the y-intercept of the line, where $T^-[y[T^+$ and $x^-[x[x^+$.

2) Maximize the minimum set-point value imposes a "fairness" objective, and reduces set-point differences among different thermostats. This technique ensures all local temperature within a thermal comfort zone. This can be stated mathematically as:

maximize min $x_i$ where x is the set-point at instant i subject to Hx+b=y where H is the slope and b is the intercept, x is the set-point, y is the measured temperature (or other measured criteria), where $T^-[y[T^+$ and $x^-[x[x^+$.

Three infeasible scenarios are provided which cover situations when it may be impossible to ensure comfort of all occupants. These include the following.

1) Minimize maximum suffering penalizes each degree "out of zone" (out of the comfort zone may be described as suffering) and imposes "fairness": the maximal suffering is minimized. This can be stated mathematically as:

minimize $\max_j (\max(0, y_j - T^+)) + (\max(0, T^- - y_j))$ where y is the measured parameter at instant or index j, subject to Hx+b=y, where $T^-[y[T^+$ and $x^-[x[x^+$.

2) Minimize total suffering imposes a "social" objective: the total degree of suffering across all occupants is minimized. This can be stated mathematically as:

$$\text{minimize} \sum_{j=1}^{m} (\max(0, y_j - T^+)) + (\max(0, T^- - y_j))$$

where y is the measured parameter at instant or index j (up to m), subject to Hx+b=y where $T^-[y[T^+$ and $x^-[x[x^+$.

3) Minimize total quadratic suffering (suffering$^2$) provides heavier penalizing the further out of zone the measurement parameter is. This can be stated mathematically as:

$$\text{minimize} \sum_{j=1}^{m} ((\max(0, y_j - T^+)) + (\max(0, T^- - y_j)))^2$$

where y is the measured parameter at instant or index j (up to m), subject to Hx+b=y, where $T^-[y[T^+$ and $x^-[x[x^+$.

It should be understood that other optimizations may be considered. Further, linear relationships described herein may be replaced by simpler or more complex functions.

Figure 2:
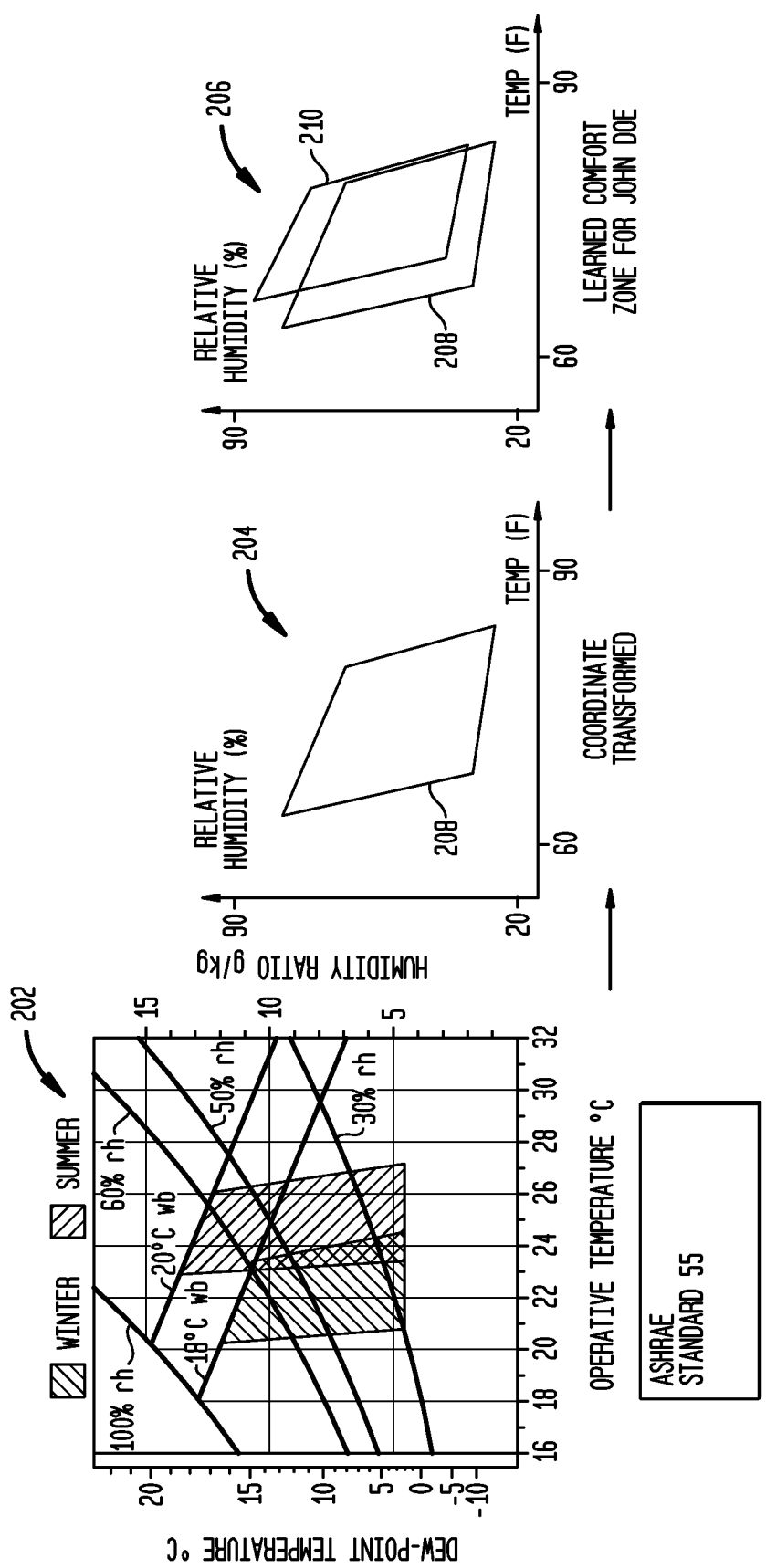
FIG. 2 is a diagram showing a standard comfort baseline transformed into a coordinate system for a given set of climate conditions and a learned comfort profile generated by showing differences from the baseline in accordance with the present principles.

Referring to FIG. 2, a standard chart 202 may be employed to determine preferred comfort levels (block 114 of FIG. 1) under given conditions. For example, an ASHRAE standard 55 chart outlines where 80% of occupants feel comfortable based on a temperature and humidity level as well as seasonal clothing that they would be wearing. Based on given conditions, a transformed coordinate graph 204 may be generated for a given set of conditions from the standard chart 202. This transformed plot 204 serves as a baseline for the current conditions.

A learned comfort zone 206 may be plotted versus the transformed coordinate 204. The zone 206 is based on a particular user's feedback to the system 100. The zone 206 is provided in the comfort profile 110 of FIG. 1. In the example shown, John Doe actually likes his environment a little warmer and with a little more humidity than what the ASHRAE standard indicates (in region 208). Region 210 shows conditions which are more comfortable for John Doe. In a preferred embodiment, a profile stored for John Doe would include only the different information (210) from the baseline data (208). The profiles may be for individuals or for a particular zone or area (corresponding to a sensor or thermostats for example). Information related to John Doe may be stored with an identifier for that information so that an individual profile would be addressed and include information for that individual only. This may also be done based on a given sensor (e.g., a sensor profile).

An individual thermal comfort zone may be, e.g., a convex combination of an ASHRAE summer profile and an ASHRAE winter profile. A learning method may be very simple. Since the individual thermal comfort zone in this example is like a sliding window between the winter profile and the summer profile, we need to estimate the convex combination coefficient a. A learning method may include:

$$a_i(k+1) = \begin{cases} \max\{a_i(k) - 0.05, 0\} & \text{if user reports too hot} \\ \min\{a_i(k) + 0.05, 1\} & \text{if user reports too cold} \end{cases}$$

In this method, the update is event-driven (k is a counter or index): it only occurs when the user is uncomfortable, and remains unchanged as long as the user is comfortable. Other learning methods may also be employed.

Figure 3:
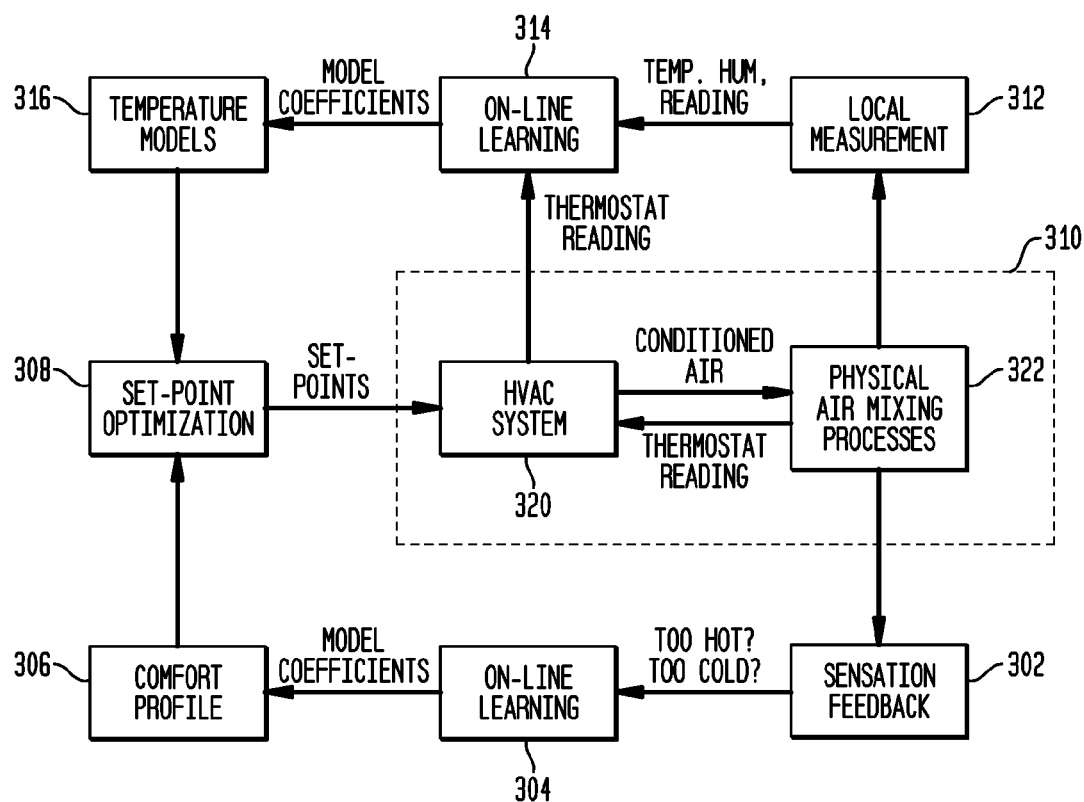
FIG. 3 is a block/flow diagram showing a system/method for generating a set-point(s) to adjust climate control equipment based on comfort profiles and sensor feedback in accordance with the present principles.

Referring to FIG. 3, a block/flow diagram depicts an illustrative embodiment for implementing the present principles. A system 300 provides heating and/or cooling for a building. The system 300 may include a single area controlled by a plurality of users. The system 300 may be repeated for several areas of a building or a plurality of areas in a plurality of buildings. The system 300 is controlled by users with devices that provide sensation feedback 302. These devices may be assigned to individuals or assigned to locations in a building or a combination of both. In one example, the users provide feedback by selecting one of two options: "too hot" or "too cold". The "too hot" or "too cold" options may be selected by pressing a corresponding button on a wireless transmitter (it can also be wired). In other embodiments, the sensor may be configured to include entry of other environmental data such as a preferred temperature and/or humidity.

Data from the sensation feedback 302 is received by an on-line learning module 304 (which executes a learning method). The on-line learning module 304 stores data from the user over time to create a comfort profile 306 for that user or for a location corresponding to the sensor or sensors. Module 304 provides model coefficients which are employed to provide factors for adjusting a baseline or standard model to enable the user preferences to be understood and recreated. Likewise, local measurements of actual conditions are measured in block 312. This may include measurements such as temperature, humidity, solar radiation, etc. On-line learning module 314 stores these local measurements over time to develop temperature (humidity, etc.) models 316 using coefficients developed by the module 314. In addition, these measurements may be employed to influence the set-point optimization in block 308.

Individualized thermal comfort profile 306 and temperature models 316 provide inputs for a set-point optimization module 308. Set-point optimization module 308 determines a best set-point based upon comfort profiles of multiple users present in the area. Temperature models 316 provide a best setting which can, for example, balance energy usage against the comfort level called for by the occupants of the area being climate controlled. The set-point optimization 308 uses the input information to balance the requirements to generate a best compromise or an optimized setting against which a climate control device 310 will be operated.

An optimized set-point controls an HVAC unit 320 of the climate control device 310. The set-point accounts for the feedback from user profiles (306) as well as historic environmental conditions (316). In one embodiment, the sensation feedback 302 may be directly employed by the HVAC system 320 to adjust environmental conditions. For example, a majority voting or polling system may be adopted such that if a number of occupants above a threshold amount selects "too hot" then the HVAC cools the area (or switches on); if a number of occupants above a threshold amount selects "too cold" then the HVAC heats the area (or switches on).

The set-point optimization profile 308 controls the HVAC system 202 based on the user's input. The system 300 learns the inter-zone temperature correlation based on everyone's input (or based on a building model) and the system 300 optimizes all set-points across all related zones to maximize energy savings subject to maintaining individual comfort. The system 300 also resolves set-point conflicts. If a conflict cannot be resolved, an individual may be moved to a more suitable environment to resolve the conflict manually. A new profile would then be learned by the system from continued feedback.

The HVAC system 320 may provide conditioned air (or fluid) to a physical mixing process device 322, and employ measurements as feedback to adjust the mixing processes. This may include for example, opening and closing vents in accordance with local user preferences. For example, a user near a vent may request or may have a profile that indicates that a higher temperature is desired. A nearby vent may be opened all the way to accommodate the comfort of that individual. The mixing process device 322 may report to the local measurement 312 and/or the sensation feedback 302 to ensure that the user preferences and settings become part of the models 316 and/or the respective comfort profiles 306.

Figure 4:
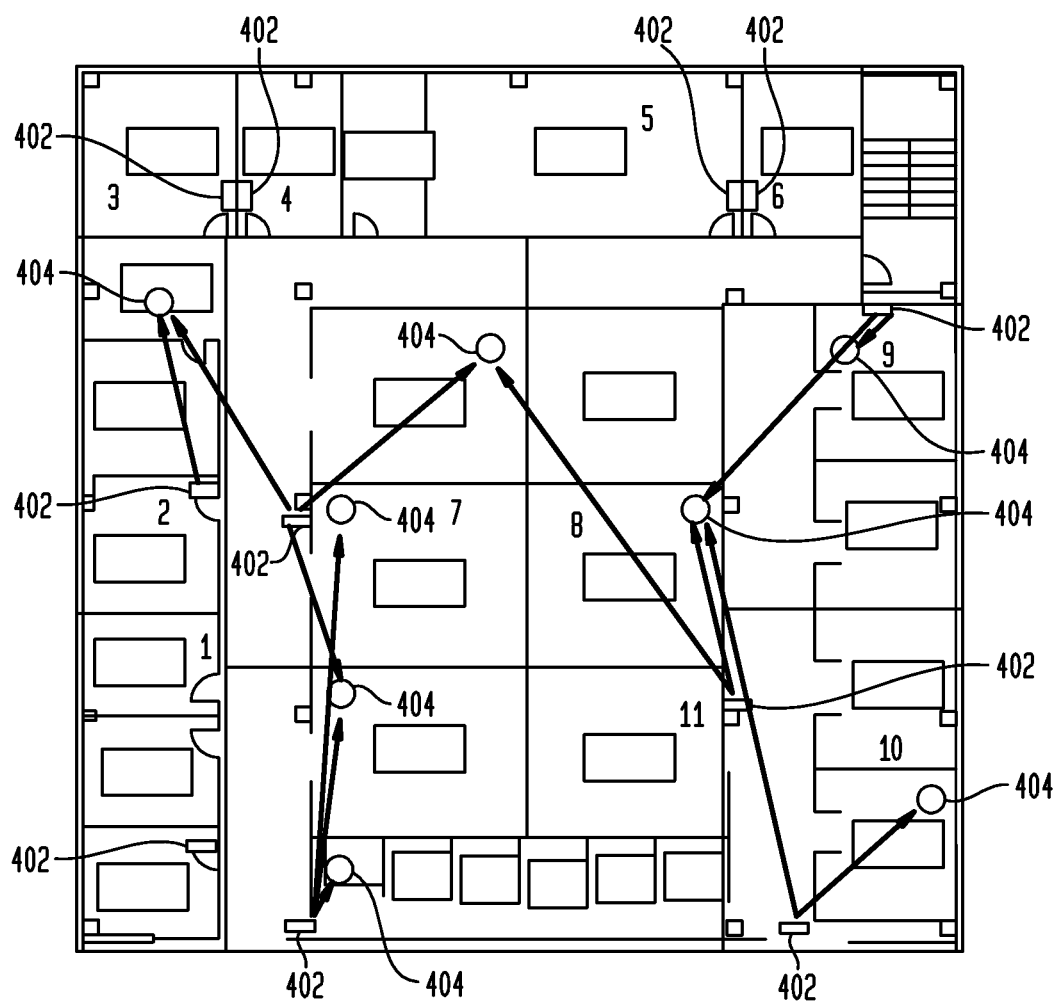
FIG. 4 is a floor plan having thermostats and sensors distributed throughout, and further showing sensor influences on the thermostats in accordance with the present principles.

Referring to FIG. 4, in one embodiment, instead of each HVAC system (220) working individually based solely on its own thermostat reading, a floor plan 400 may be divided up into its different zones based on HVAC system duct work and based on which areas the duct work is conditioning. A system then controls all the HVAC units in the floor plan with influences from different zones to thereby maximize everyone's comfort and maximize energy savings. This also alleviates the possibility that two HVAC systems will be in conflict with each other where both units would be on, e.g., one in heat mode and the other in cool mode.

In FIG. 4, eleven different zones are illustratively depicted and numbered 1-11 in the floor plan 400. The 11 zones are controlled by 11 different thermostats 402. Sensors 404 are affixed at the locations indicated. In any particular application, there could be more or less of either sensors or thermostats but in normal situations there will be more sensors 404 than thermostats 402. In this embodiment, the thermostats 402 control the HVAC unit(s). The thermostats 402 receive information from the sensors 404 that cross and influence their zones (indicated by arrows) or the sensors 404 may be directly connected to thermostats 402. Preferably the thermostat 402 that controls a given region is controlled by the sensors 404 in that region. In this way, the sensors 404 control the set-points for the thermostats 402 that affect cooling or heating in the area.

In this embodiment, the sensors 404 may include a temperature setting. A user in the vicinity of one of the sensors 404 may enter a preferred temperature. If there are multiple sensors in an area the entered temperatures may be averaged together, or weighted averaged to provide a set-point for a given thermostat 402.

In one embodiment, all occupants have their own sensor 404 to provide feedback to the thermostats 402. Alternately, the user profiles (see FIG. 1) may be employed to set the thermostat set-points. The number of zones may be controlled through vents and HVAC units to generate a comfort profile with a plurality of different micro-climes in a single area or on a single floor in a building.

Figure 5:
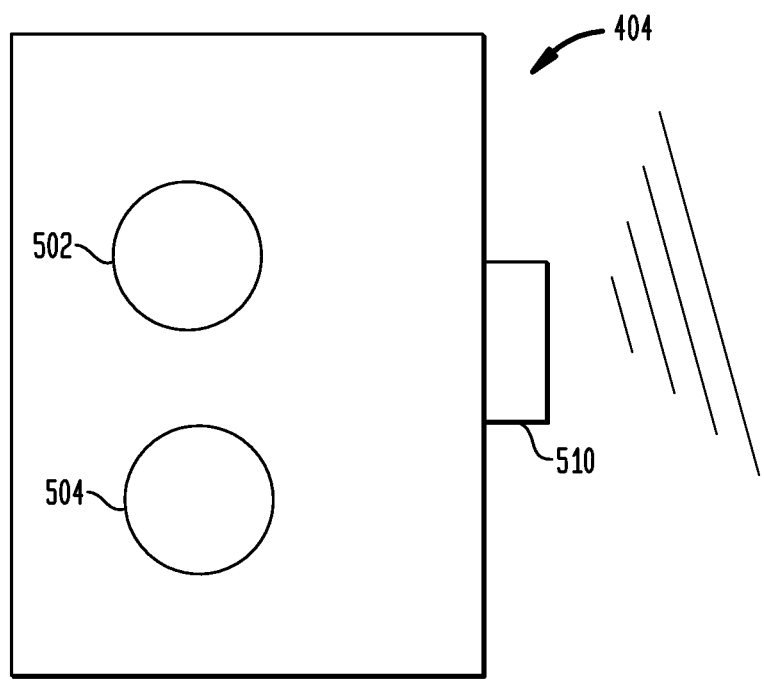
FIG. 5 is perspective view of an illustrative wireless sensor device in accordance with the present principles.

Referring to FIG. 5, a sensor 404 is illustratively depicted. Sensor 404 may include a wireless device that transmits information to a thermostat or to a controller (e.g., 104). In a simple form of the sensor 404, a "too hot" button 502 and a "too cold" button 504 are provided. Wireless sensor 404 may be mounted to a wall or furniture (e.g., a desk), may be installed in a computer, a telephone or other device or may be carried by an individual. Sensors 404 carried around by individuals may use Blue Tooth™ technology or the like in a given area to report conditions to a local thermostat or other receiving device. Wireless devices 404 may include identifiers that identify a given user when a signal is transmitted. In this way, profiles for individuals may be obtained and employed to control the temperature or other room conditions. In accordance with particularly useful embodiments, thermostats may be replaced by human to machine interface (HMI) devices that simply display what the HVAC system is doing at the time. In one embodiment, a transmitter 510 communicates wirelessly with the controller (104) and/or thermostats (108) or other climate control devices.

Referring to FIG. 6, another embodiment will illustratively be described using a single family home 500. In a home 500, only one or two thermostats may be present; however, comfort calibration in accordance with the present principles may still be employed by having sensors 504 which actually read temperature and/or humidity, etc. in multiple locations (one outside of the house located in a fully shaded area and others inside the house in various locations where you are interested in keeping uniform temperature readings). This new type of thermostat 502 would have the ability to get periodic readings from these sensors 504 and automatically change its set-point based on its manually set temperature setting and the values of these other sensors 504. If you have more than one HVAC system in the house 500, each thermostat may relay information to the other unit as in On/Off values, and its own set-point and whether it is cooling or heating. The other system would then be able to react to this unit by automatically changing its own set-point so that it will turn off earlier than it normally would to conserve energy.

For example, the house 500 includes a side room 510 with a sensor 504 (not shown), a front porch 512 with a sensor 504 in a shaded area, a main level 514 with a sensor 504 (not shown) and a first thermostat 502, an upper level 516 with a sensor 504 (not shown) and a second thermostat 502 and an attic 520 with a sensor 504 (not shown). Two HVAC systems (Main Level and Upper Level) are controlled by the thermostats 502, and the thermostats 502 are set using a computer device or controller (not shown) that optimizes the set-point using sensor information.

In the summertime, the HVAC units are configured to cool the house 500. Readings of the sensors 504 are taken. For example, a main unit's set-point is 78° F. but the main temperature reading is 73° F. and the outside reading (front porch 512) was 68° F. So the windows could be opened and the calibrated set-point of the thermostat may be raised from the hand input set-point of 78° F. to 79.25° F. by a calibration routine on the computer device. Conversely, the upper level 516 is still cooling off. The attic 520 decreased from its maximum level of 110° F. during that day to a level of 74° F. at the present time. However, the upper level temperature reading is 80° F. The set-point was set to 78° F. and the HVAC unit was on and cooling. The calibrated set-point value is set by the routine to actually shut off at 78.45° F. because in this system both the outside temperature and the attic temperature are taken in consideration to get the calibrated set-point. In this instance, the set-point determination actually saves energy because the units shut off earlier than normal, but comfort level is still maintained since the outside temperatures were actually falling below the set-point values.

Referring to FIG. 7, a system/method for optimizing a set-point for climate control equipment is illustratively depicted. In block 602, a sensor network is installed. The sensors may include wireless sensors that report a comfort level adjustment on a particular sensor (too high or too low) or the sensors may be configured to report an actual climate condition (temperature, humidity, etc.). In yet another embodiment, the sensors may be capable of reporting a desired setting, e.g., set temperature at 68 degrees, etc. Buttons to store comfort preferences may be provided and the activation of the buttons may be part of the information stored in a profile associated with that sensor at its location.

In block 604, a climate profile is generated that is associated with a sensor at a given location based upon occupant feedback of comfort and historic data. The profile may include adjustments to a comfort baseline using HVAC standards or a customized baseline. The system preferably includes a plurality of sensors, each having its own profile. The profiles may include climate comfort information that deviates from a comfort baseline.

In block 606, a set-point is generated for a climate control unit by optimizing, e.g., between comfort and energy savings, by considering a plurality of climate profiles and/or sensors for a given location. The climate profiles are those associated with nearby sensors, which sensors, which sensor profiles or which other inputs are determined in accordance with the optimization program. Climate information may be input directly from the sensors and/or information from a statistical model may be input, which considers climate information in areas that influence a current area being climate controlled.

An optimization program may include performing a regression analysis to determine a relationship between a measured temperature and a thermostat temperature. The relationship can then be optimized (e.g., differentiated and set to zero to find extrema). The relationship can be determined in a plurality of ways. One example includes a multivariate regression model where different measurements are input to determine relationships between different requirements. More complicated models may also be employed, e.g., neural networks or the like. Once the relationship for a given environment is understood (e.g., in the form of an objective function) a set-point is optimized that balances between competing goals. Other influences may be programmed into the objective function or into the control of a given zone or area such as adjacent climate conditions (e.g., attic temperatures, outdoor temperatures, nearby zone temperatures, etc.). For example, the sensors are associated with locations in a floor plan and a profile associated with a given sensor may be employed to influence one or more thermostats in an area of the floor plan.

In block 608, climate conditions are adjusted at the given location in accordance with the set-point. The climate conditions may be affected in many ways. For example, vents may be opened/closed, units turned on/off, ventilation increased/decreased, etc. The profiles (block 604), set-points (block 606) and climate condition adjustments (block 608) are constantly or periodically updated with changing conditions.

In block 610, historic data may optionally be employed to lay out a preference map of a given floor plan. The floor plan may have areas where the temperature or humidity is maintained at different levels than other areas. Occupants may select office space or other space to occupy based upon the historic data to meet their personal preferences.

Having described preferred embodiments for system and method for climate control set-point optimization based on individual comfort (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A system for calibrating a set-point for climate control, comprising:
   a sensor network having a plurality of sensors wherein each occupant in a space is associated with a sensor and each sensor is configured to report a comfort level for the associated occupant;
   a database including an industry comfort standard for specifying environmental conditions that are acceptable to a majority of occupants in a space wherein the industry comfort standard defines a baseline comfort level, the database configured to receive reports from the sensors associated with each occupant on a preferred occupant comfort level for each occupant to generate an individual profile for each occupant including climate comfort information on the difference between the preferred occupant comfort level and the baseline comfort level wherein the preferred occupant comfort level includes a learned comfort zone based on summer and winter profiles of the industry standard; and
   a controller configured to receive information from the individual profiles for each occupant to generate a set-point based upon an optimization program configured to balance competing goals to generate the set-point for controlling climate control equipment in accordance with the set-point.

2. The system as recited in claim 1, wherein the optimization program receives as input climate information directly from the sensors.

3. The system as recited in claim 1, wherein the optimization program receives as input information from a statistical model, which considers climate information in areas that influence a current area being climate controlled.

4. The system as recited in claim 1, further comprising a thermostat configured to be programmed in accordance with the set-point wherein the set-point controls a heating ventilation and air conditioning unit.

5. The system as recited in claim 1, wherein the sensors include a first button to indicate that a current temperature is too high and a second button to indicate that a current temperature is too low, and activation of the first or second button is stored in a profile associated with that sensor at its location.

6. The system as recited in claim 1, wherein the sensors are associated with a location in a floor plan and a profile associated with a given sensor is employed to influence one or more thermostats in an area of the floor plan.

7. The system as recited in claim 1, wherein the competing goals include comfort versus energy savings.

8. A system for calibrating a set-point for climate control, comprising:

a sensor network having a plurality of sensors wherein each occupant in a space is associated with a sensor and each sensor is configured to report a comfort level for the associated occupant;

a database including an industry comfort standard for specifying environmental conditions that are acceptable to a majority of occupants in a space wherein the industry comfort standard defines a baseline comfort level, the database configured to receive reports from the sensors associated with each occupant on a preferred occupant comfort level for each occupant to generate an individual profile for each occupant including climate control information on the difference between the preferred occupant comfort level and the baseline comfort level wherein the preferred occupant comfort level includes a learned comfort zone based on summer and winter profiles of the industry standard wherein the database further includes a preference map of a floor plan and wherein the preference map is based on historic climate control data; and a controller configured to receive information from the individual profiles for each occupant to generate a set-point based upon an optimization program, the optimization program being implemented to balance competing goals to generate the set-point for controlling climate control equipment in accordance with the set-point in a controlled area wherein if the preferred occupant comfort level is not provided in the controlled area, the occupant selects a space that is part of the preference map.

9. The system as recited in claim 8, wherein the optimization program receives as input climate information directly from the sensors.

10. The system as recited in claim 8, further comprising a thermostat configured to be programmed in accordance with the set-point wherein the set-point controls a heating ventilation and air conditioning unit.

11. The system as recited in claim 8, further comprising a thermostat configured to function as one of the sensors.

12. The system as recited in claim 8, wherein the sensors include a temperature measurement sensor and a temperature is reported to the controller.

13. The system as recited in claim 8, wherein the sensors are associated with a location in a floor plan and the location of the sensor is employed to influence one or more thermostats in an area of the floor plan.

14. The system as recited in claim 8, wherein the competing goals include comfort versus energy savings.

15. A method for optimizing a set-point for climate control equipment, comprising:

providing a sensor network having a plurality of sensors wherein each occupant in a space is associated with a sensor and each sensor is configured to report a comfort level for the associated occupant;

providing a database including an industry comfort standard for specifying environmental conditions that are acceptable to 80% of occupants in a space wherein the industry comfort standard defines a baseline comfort level, the database configured to receive reports from the sensors associated with each occupant on a preferred occupant comfort level for each occupant to generate an individual profile for each occupant including climate control information on the difference between the preferred occupant comfort level and the baseline comfort level wherein the preferred occupant comfort level includes a learned comfort zone based on summer and winter profiles of the industry standard;

generating a set-point for a climate control unit by optimizing between comfort and energy savings; and adjusting climate conditions at the given location in accordance with the set-point.

16. The method as recited in claim 15, wherein generating a set-point includes inputting at least one of climate information directly from the sensors and information from a statistical model, which considers climate information in areas that influence a current area being climate controlled.

17. The method as recited in claim 15, wherein the sensors include a first button to indicate that a current temperature is too high and a second button to indicate that a current temperature is too low, and the method further comprising activating the first or second button to store comfort preferences in a profile associated with that sensor at its location.

18. The method as recited in claim 1, wherein the sensors are associated with a location in a floor plan and a profile associated with a given sensor is employed to influence one or more thermostats in an area of the floor plan.

* * * * *